United States Patent
Steinhardt

(10) Patent No.: US 10,830,901 B2
(45) Date of Patent: Nov. 10, 2020

(54) METHOD FOR SELECTING A SATELLITE

(71) Applicant: Continental Teves AG & Co. OHG, Frankfurt (DE)

(72) Inventor: Nico Steinhardt, Frankfurt (DE)

(73) Assignee: CONTINENTAL TEVES AG & CO. AHG, Frankfurt (DE)

( * ) Notice: Subject to any disclaimer, the term of this patent is extended or adjusted under 35 U.S.C. 154(b) by 327 days.

(21) Appl. No.: 15/815,839

(22) Filed: Nov. 17, 2017

(65) Prior Publication Data

US 2018/0203128 A1 Jul. 19, 2018

Related U.S. Application Data

(63) Continuation of application No. 14/344,440, filed as application No. PCT/EP2012/067866 on Sep. 12, 2012, now Pat. No. 9,903,956.

(30) Foreign Application Priority Data

| Sep. 12, 2011 | (DE) | 10 2011 082 534 |
| Sep. 12, 2011 | (DE) | 10 2011 082 539 |
| Nov. 21, 2011 | (DE) | 10 2011 086 710 |
| May 2, 2012 | (DE) | 10 2012 207 297 |

(51) Int. Cl.
*G01S 19/28* (2010.01)
*G01S 19/22* (2010.01)
*G01S 19/52* (2010.01)
G01S 19/21 (2010.01)
G01S 19/20 (2010.01)
G01S 19/51 (2010.01)

(52) U.S. Cl.
CPC .............. *G01S 19/28* (2013.01); *G01S 19/22* (2013.01); *G01S 19/52* (2013.01); G01S 19/20 (2013.01); G01S 19/21 (2013.01); G01S 19/215 (2013.01); G01S 19/51 (2013.01)

(58) Field of Classification Search
CPC .......... G01S 19/28; G01S 19/20; G01S 19/21; G01S 19/215; G01S 19/22; G01S 19/51; G01S 19/52
USPC .......................... 342/357.34, 357.51, 357.67
See application file for complete search history.

(56) References Cited

U.S. PATENT DOCUMENTS

| 5,323,152 | A | * | 6/1994 | Morita | ..................... | G01S 19/49 |
| | | | | | | 340/988 |
| 5,862,511 | A | * | 1/1999 | Croyle | ................... | G01C 21/28 |
| | | | | | | 701/445 |
| 7,450,063 | B2 | * | 11/2008 | Kangas | ................... | G01S 19/09 |
| | | | | | | 342/357.25 |
| 7,835,863 | B2 | * | 11/2010 | Lokshin | ............... | G01C 21/165 |
| | | | | | | 701/472 |

(Continued)

*Primary Examiner* — Chuong P Nguyen
(74) *Attorney, Agent, or Firm* — Dickinson Wright PLLC

(57) ABSTRACT

The invention relates to a method for selecting a satellite which is designed to send a global navigation satellite system-signal, also known as a GNSS-Signal, to a vehicle, consisting of: measuring measurement position data of the vehicle in relation to the satellite based on the GNSS-Signal; determining redundant reference position data of the vehicle in relation to the measurement position data determined according to the GNSS-Signal; and selecting the satellite when a comparison of the measurement position data and the reference position data meets a predetermined condition.

1 Claim, 3 Drawing Sheets

(56) References Cited

U.S. PATENT DOCUMENTS

| | | | |
|---|---|---|---|
| 7,987,047 B2* | 7/2011 | Ishigami | G01C 21/165 |
| | | | 701/478.5 |
| 8,072,378 B2* | 12/2011 | Yu | G01S 19/20 |
| | | | 342/357.58 |
| 8,384,589 B2* | 2/2013 | Watanabe | G01S 19/52 |
| | | | 342/357.23 |
| 9,253,751 B2* | 2/2016 | Shirai | H04W 64/006 |
| 9,322,926 B2* | 4/2016 | Sagiraju | G01S 19/246 |
| 10,399,583 B2* | 9/2019 | Iwamoto | G01S 19/50 |
| 2008/0297412 A1* | 12/2008 | Hamada | G01S 19/23 |
| | | | 342/357.29 |
| 2013/0002480 A1* | 1/2013 | Pratt | G01S 19/42 |
| | | | 342/357.25 |
| 2019/0094386 A1* | 3/2019 | Matsue | G01C 21/165 |

* cited by examiner

METHOD FOR SELECTING A SATELLITE

CROSS-REFERENCE TO RELATED APPLICATIONS

This application is a continuation of U.S. patent application Ser. No. 14/344,440, filed Jul. 31, 2014, which claimed priority to German Application Nos. 10 2011 082 534.7, filed Sep. 12, 2011, 10 2011 082 539.8, filed Sep. 12, 2011, 10 2011 086 710.4, filed Nov. 21, 2011, 10 2012 207 297.7, filed May 2, 2012, and International Application No. PCT/EP2012/067866, filed Sep. 12, 2012, all of which are herein incorporated by reference in their entirety.

FIELD OF THE INVENTION

The invention relates to a method for selecting a satellite that is designed to send a GNSS signal to a vehicle, a control apparatus for performing the method and a vehicle having the control apparatus.

BACKGROUND OF THE INVENTION

WO 2011/098333 A1 discloses the practice of using different sensor variables in a vehicle in order to improve already existent sensor variables or to generate new sensor variables and hence to enhance the recordable information.

It is an object to improve the use of a plurality of sensor variables for enhancing information.

SUMMARY AND INTRODUCTORY DESCRIPTION OF THE INVENTION

The object is achieved by the technical features disclosed herein and by way of the method disclosed herein.

According to one aspect of the invention, a method for selecting a satellite that is designed to send a global navigation satellite system signal, called a GNSS signal below, to a vehicle comprises the steps of:

measurement of measurement location data for the vehicle with respect to the satellite on the basis of the GNSS signal, determination of reference location data for the vehicle that are redundant relative to the measurement location data determined on the basis of the GNSS signal; and selection of the satellite when juxtaposition of the measurement location data and the reference location data satisfies a predetermined condition.

The specified method is based on the consideration that position information for the vehicle could be derived from the GNSS signal. On the basis of this consideration, however, the specified method involves recognizing that the GNSS signal could, prior to being received at the vehicle, pass through different sources of interference that could add noise to the GNSS signal, as a result of which it no longer indicates the true position of the vehicle. Such sources of interference could be multipath reception, shadowing or reflections.

On the basis of these considerations, it is a concept of the specified method to stipulate for the GNSS signal an expected value from which a reference for the quality of the GNSS signal can be derived with sufficient precision. If the deviation between the GNSS signal and the expected value used as a reference is sufficiently small, the satellite is selected as a source for the GNSS signal.

In one development, the juxtaposition of the measurement location data and the reference location data involves a difference being formed between the measurement location data and the reference location data. This development is based on the consideration that although the juxtaposition could be performed on the basis of any desired filter, the difference between the two location data immediately reveals the deviation therein relative to one another, which provides a statistical description of the GNSS signal and hence immediately permits the quality thereof to be assessed.

In this regard, it may be preferred for a predetermined condition that is permitted to be a maximum admissible error between the measurement location data and the reference location data that is in turn a quality control for the selection of the satellite.

With particular preference, the maximum admissible error may be dependent on a standard deviation that is calculated on the basis of a sum comprising a reference variance for the reference location data and a measurement variance for the measurement location data. This development is based on the consideration that in this case two statistical values are simultaneously used for the selection of the satellite. The reference value could be determined iteratively, with the quality thereof becoming ever higher with ascending iteration steps. However, this means that the reference value may itself have a high level of noise and contain errors at first, which is why it would not be expedient at this time to select a GNSS signal with a very high quality. Since the maximum admissible error and hence the admissible deviation are chosen on the basis of the variances and hence the noise in the two location data, the maximum admissible error between the location data and the noise in the location data themselves are correlated for the selection. This ensures that the noise from the satellite to be selected matches the deviation between the expected value and the measured value represented by the GNSS signal.

In an additional development of the specified method, the maximum admissible error corresponds to a multiple of the standard deviation such that a probability that the measurement location data are below a predetermined threshold value in a scatter range that is dependent on the standard deviation. This ensures that the inevitable scatter in the deviations between the reference location data, that is to say the expected value, and the measured location data, that is to say the measured value, does not select a satellite that is actually suitable on a nonrandom basis.

According to a further aspect of the specified invention, a method for selecting a satellite that is designed to send a global navigation satellite system signal, called a GNSS signal below, to a vehicle comprises the steps of:

measurement of measurement location data for the vehicle with respect to the satellite on the basis of the GNSS signal, selection of the satellite when the measurement location data satisfy a predetermined condition.

The specified method is based on the consideration that the satellite could be selected just using hard decision bases, because the vehicle that uses the GNSS signal is subject to particular physical constraints. By way of example, the vehicle must not accelerate arbitrarily and is also unable to travel at an arbitrary speed. These physical constraints can be used as a basis for selecting the satellite without the need for further comparison measurements in order to check the quality of the GNSS signal.

Therefore, the predetermined condition may preferably be a physical constraint to which the vehicle is subject.

With particular preference, the physical constraint may be a limit acceleration and/or a limit speed for the vehicle.

In one particular development of the specified method, the measurement location data may comprise a speed and/or an acceleration, for example, that is derived from the GNSS signal. In this way, it is possible to check directly whether or not the aforementioned physical constraints are satisfied.

According to a further aspect of the specified invention, a method for selecting a satellite that is designed to send a global navigation satellite system signal, called a GNSS signal below, to a vehicle comprises the steps of:

recording of a location for at least three satellites among one another, said satellites comprising the satellites to be selected;

measurement of measurement location data for the vehicle with respect to the satellite on the basis of the GNSS signal from the satellite to be selected, selection of the satellite to be selected on the basis of juxtaposition of the location of the three satellites relative to one another and the measurement location data.

The specified method is based on the consideration that the three satellites with the satellite to be selected may have an inherently known location relative to one another. On the basis of this known location, the vehicle must also move in a manner that is to be expected with respect to these three satellites. This movement that is to be expected can be used as a decision basis for selecting the GNSS signal and hence the satellite to be selected.

In this case, the specified method involves recognizing that the location of the three satellites relative to one another comprises relative position statements. In order for a GNSS signal to be incorrectly interpreted as error-free, the GNSS signals from all three GNSS satellites would need to be corrupted in an exactly identical manner by shadowing, multiple reflections, and so on, which is as good as ruled out on account of the totally different signal propagation paths, however. Therefore, the specified method delivers a very reliable decision basis for the selection of a satellite.

In one development of the specified method, the juxtaposition of the location of the three satellites relative to one another and the measurement location data comprises juxtaposition of the distances of the vehicle relative to the three satellites. This development is based on the consideration that the GNSS signals from the three satellites could be examined for any inconsistencies on the basis of the location of the satellites relative to one another. If all three satellites are in front of the vehicle from the point of view of the direction of travel of the vehicle, for example, then all three distances must be shorter. In addition, from trigonometric perspectives, it is possible to determine how quickly individual distances from the vehicle to the relevant satellite can become shorter. The distances of the satellites relative to one another can be derived from information transmitted by the satellites.

According to a further aspect of the specified invention, a method for selecting a satellite that is designed to send a global navigation satellite system signal, called a GNSS signal below, to a vehicle comprises the steps of:

recording of a distance for the vehicle relative to the satellite and of a relative speed for the vehicle relative to the satellite in the visual direction of the satellite from the GNSS signal;

selection of the satellite on the basis of juxtaposition of the recorded distance and the recorded relative speed.

The specified method is based on the consideration that the distance from the vehicle to the satellite and the relative speed of the vehicle with respect to the satellite are dependent on one another, that is to say correlated. In addition, the specified method is based on the consideration that the relative speed could be recorded from the GNSS signal, for example on the basis of Doppler effects, while the distance from the vehicle to the satellite could be recorded on the basis of a propagation time of the GNSS signal, for example, and hence independently of the measurement for recording the relative speed. The concept of the specified method is thus that it is nevertheless necessary for both measurements to match, that the measured variables to be recorded, that is to say the relative speed and the distance, are dependent on one another.

The juxtaposition can be effected arbitrarily on the basis of difference formation or other filtering. Difference formation immediately reveals the decision basis for selection of the satellite with minimum computation time.

For all methods specified above, the following developments can also be implemented:

The measurement location data for the vehicle and the reference location data for the vehicle may each comprise a distance from the satellite and/or a relative speed in the visual direction of the satellite. That is to say that the method specified according to the last aspect of the invention selects the satellite on the basis of an analysis of the measurement location data in themselves, this making use of the advantage that the GNSS signal transmits the measurement location data using principles that can be recorded by measurement in two different ways.

In a preferred development of one of the specified methods, the distance from the satellite and/or the relative speed in the visual direction of the satellite can be ascertained as appropriate from a code measurement and a phase measurement for the GNSS signal.

The GNSS signal used may be a global positioning system signal, GPS signal for short, a Глобальная Навигационная Спутниковая Система signal, GLONASS signal for short, or a Galileo signal, for example. Hence, an alternative or additional comparison variable for the vehicle longitudinal speed would be available, on the basis of which the information content of the tire radius to be recorded could be improved. By way of example, the GNSS signal allows network subscribers in an onboard network on the vehicle, such as sensors, to have their timing synchronized with a correspondingly high level of precision on account of the high-precision timestamp of said signal. Such synchronization is currently the focus of current development pertaining to Car2X communication, that is to say data interchange from a vehicle to other vehicles or systems in the surroundings, such as traffic lights or other infrastructure components. The interchange of information about accidents and other hazard locations, about the condition of the road, road signs and much more makes it possible to attain an increase in safety and convenience. In many cases, this needs to involve the information being provided in real time. in order to ensure this real time, the information can be provided with a high-precision timestamp, for example, which is linked to the information by the respective network subscriber. This timestamp needs to have a correspondingly high level of precision, however, which is ensured by the selection of an uncorrupted GNSS signal.

In another development of one of the specified methods, the reference location data are dependent on driving dynamics data and/or odometry data for the vehicle. This development is based on the consideration that the reference location data can be defined more precisely on the basis of the GNSS signal, for example in a fusion filter. This could be accomplished by juxtaposing the reference location data with the GNSS signal itself or location data derived from the GNSS signal, like the measurement location data, in an observer, for example. Such an observer may include any filter that permits analog or digital state observation of the vehicle. It is thus possible to use a Luenberger observer, for example. If the noise also needs to be taken into account, a Kalman filter would be suitable. If the shape of the noise also needs to be taken into account, it would be possible, if need be, to use a particle filter, which has a basic set of available noise scenarios and selects the noise scenario that is to be taken into account for the elimination using a Monte Carlo simulation, for example. The observer is preferably a Kalman filter, which provides an optimum result in respect of the computation resources that it requires. The observation makes the reference location data ever more precise over time and said data therefore also allow ever more precise GNSS signals to be selected.

According to a further aspect of the invention, a control apparatus is set up to perform one of the specified methods.

In one development of the specified control apparatus, the specified apparatus has a memory and a processor. In this case, a specified method is stored in the memory in the form of a computer program, and the processor is provided for the purpose of executing the method when the computer program is loaded from the memory into the processor.

According to a further aspect of the invention, a computer program comprises program code means in order to perform all the steps of one of the specified methods when the computer program is executed on a computer or one of the specified apparatuses.

According to a further aspect of the invention, a computer program product contains a program code that is stored on a computer-readable data storage medium and that, when executed on a data processing device, performs one of the specified methods.

According to a further aspect of the invention, a vehicle comprises a specified control apparatus.

BRIEF DESCRIPTION OF THE DRAWINGS

The properties, features and advantages of this invention that are described above and also the manner in which these are achieved become more clearly and more distinctly comprehensible in connection with the description below of the exemplary embodiments, which are explained in more detail in connection with the figures, in which.

DETAILED DESCRIPTION OF THE INVENTION

In the figures, technical elements that are the same are provided with the same reference symbols and are described only once.

Figure 1:
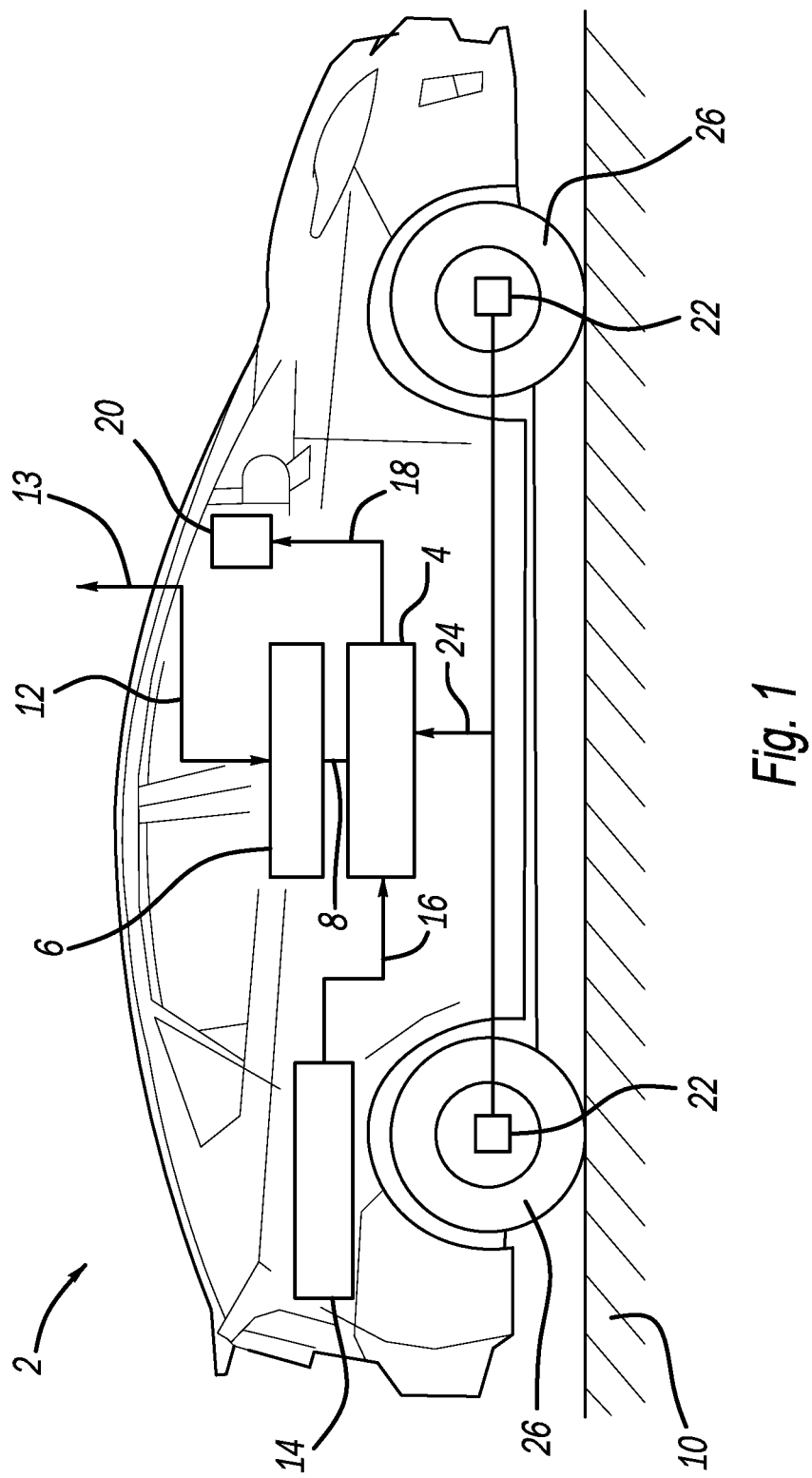
FIG. 1 shows a basic illustration of a vehicle with a fusion sensor.

Reference is made to FIG. 1, which shows a basic illustration of a vehicle 2 with a fusion sensor 4.

In the present embodiment, the fusion sensor 4 uses an inherently known GNSS receiver 6 to receive location data 8 for the vehicle 2, which data comprise an absolute position for the vehicle 2 on a road 10. Besides the absolute position, the location data 8 from the GNSS receiver 6 also comprise a speed for the vehicle 2. In the present embodiment, the location data 8 from the GNSS receiver 6 are derived—in a manner that is known to a person skilled in the art—in the GNSS receiver 6 from a GNSS signal 12 that is received via a GNSS antenna 13 and that is therefore called GNSS location data 8 below. For details in this regard, reference is made to the relevant specialist literature in this regard.

The fusion sensor 4 is designed—in a manner that is yet to be described—to enhance the information content of the GNSS location data 8 derived from the GNSS signal 12. This is firstly necessary because the GNSS signal 12 may have a very high signal-to-noise band ratio and may thus be very imprecise. Secondly, the GNSS signal 12 is not always available.

In the present embodiment, the vehicle 2 also has an inertial sensor 14 that captures driving dynamic data 16 for the vehicle 2. These are known to include a longitudinal acceleration, a lateral acceleration and also a vertical acceleration and a roll rate, a pitch rate and also a yaw rate for the vehicle 2. In the present embodiment, these driving dynamics data 16 are used in order to enhance the information content of the GNSS location data 8 and, by way of example, to define the position and the speed of the vehicle 2 on the road 10 more precisely. The more precisely defined location data 18 can then be used by a navigation appliance 20 itself even when the GNSS signal 12 is not available at all, for example in a tunnel.

To further enhance the information content of the GNSS location data 8, the present embodiment may optionally also make use of wheel speed sensors 22 that record the wheel speeds 24 of the individual wheels 26 of the vehicle 2.

Figure 2:
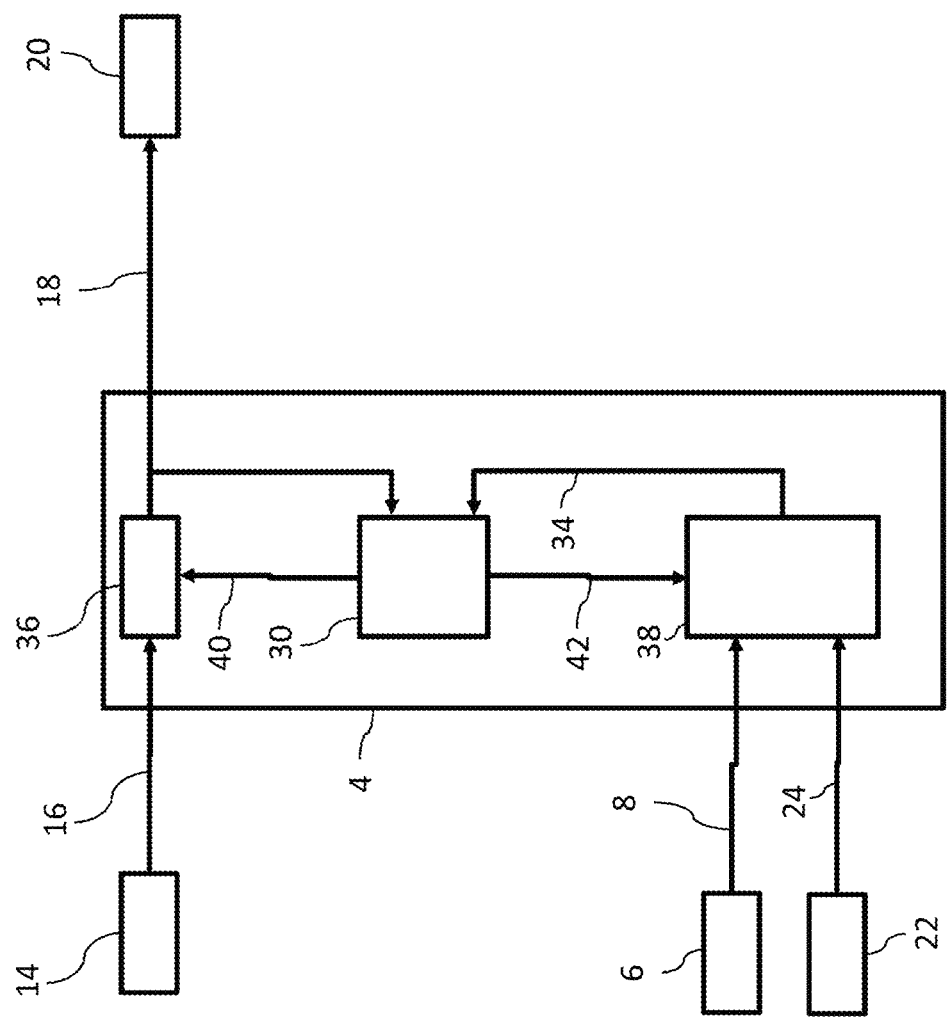
FIG. 2 shows a basic illustration of the fusion sensor from FIG. 1.

Reference is made to FIG. 2, which shows a basic illustration of the fusion sensor 4 from FIG. 1.

The fusion sensor 4 receives the measurement data already mentioned in FIG. 1. The fusion sensor 4 is intended to output the more precisely defined location data 18. The basic concept in this regard is that of juxtaposing the information from the GNSS location data 8 with the driving dynamics data 16 from the inertial sensor 14 into a filter 30 and thus increasing a signal-to-noise band ratio in the location data 8 from the GNSS receiver 6 or the driving dynamics data 16 from the inertial sensor 14. To this end, although the filter may be in any form, a Kalman filter achieves this object most effectively with comparatively low computational resource requirement. Therefore, the filter 30 below will preferably be a Kalman filter 30.

The Kalman filter 30 receives the more precisely defined location data 18 for the vehicle 2 and comparison location data 34 for the vehicle 2. In the present embodiment, the more precisely defined location data 18 are generated from the driving dynamics data 16 using a strapdown algorithm 36, which is known from DE 10 2006 029 148 A1, for example. Said data contain more precisely defined position information about the vehicle, but also other location data about the vehicle 2, such as the speed thereof, the acceleration thereof and the heading thereof. By contrast, the comparison location data 34 are obtained from a model 38 of the vehicle 2 that is first of all fed with the GNSS location data 8 from the GNSS receiver 6. These GNSS location data 8 are then used in the model 38 to determine the comparison location data 34, which contain the same information as the more precisely defined location data 18. The more precisely defined location data 18 and the comparison location data 34 differ only in terms of their values.

The Kalman filter 30 takes the more precisely defined location data 18 in the comparison location data 34 as a basis for calculating an error budget 40 for the more precisely defined location data 18 and an error budget 42 for the comparison location data 34. An error budget is intended to be understood below to mean a total error in a signal, which is made up of various individual errors during the recording and transmission of the signal. In the case of the GNSS signal 12 and hence in the case of the GNSS location data 8, a corresponding error budget may be made up of errors in the satellite orbit, in the satellite clock, in the residual refraction effects and of errors in the GNSS receiver 6.

The error budget 40 for the more precisely defined location data 18 and the error budget 42 for the comparison location data 34 are then supplied as appropriate to the strapdown algorithm 36 and to the model 38 for the purpose of correcting the more precisely defined location data 18 or the comparison location data 34. This means that the more precisely defined location data 18 and the comparison location data 34 are iteratively purged of their errors.

Figure 3:
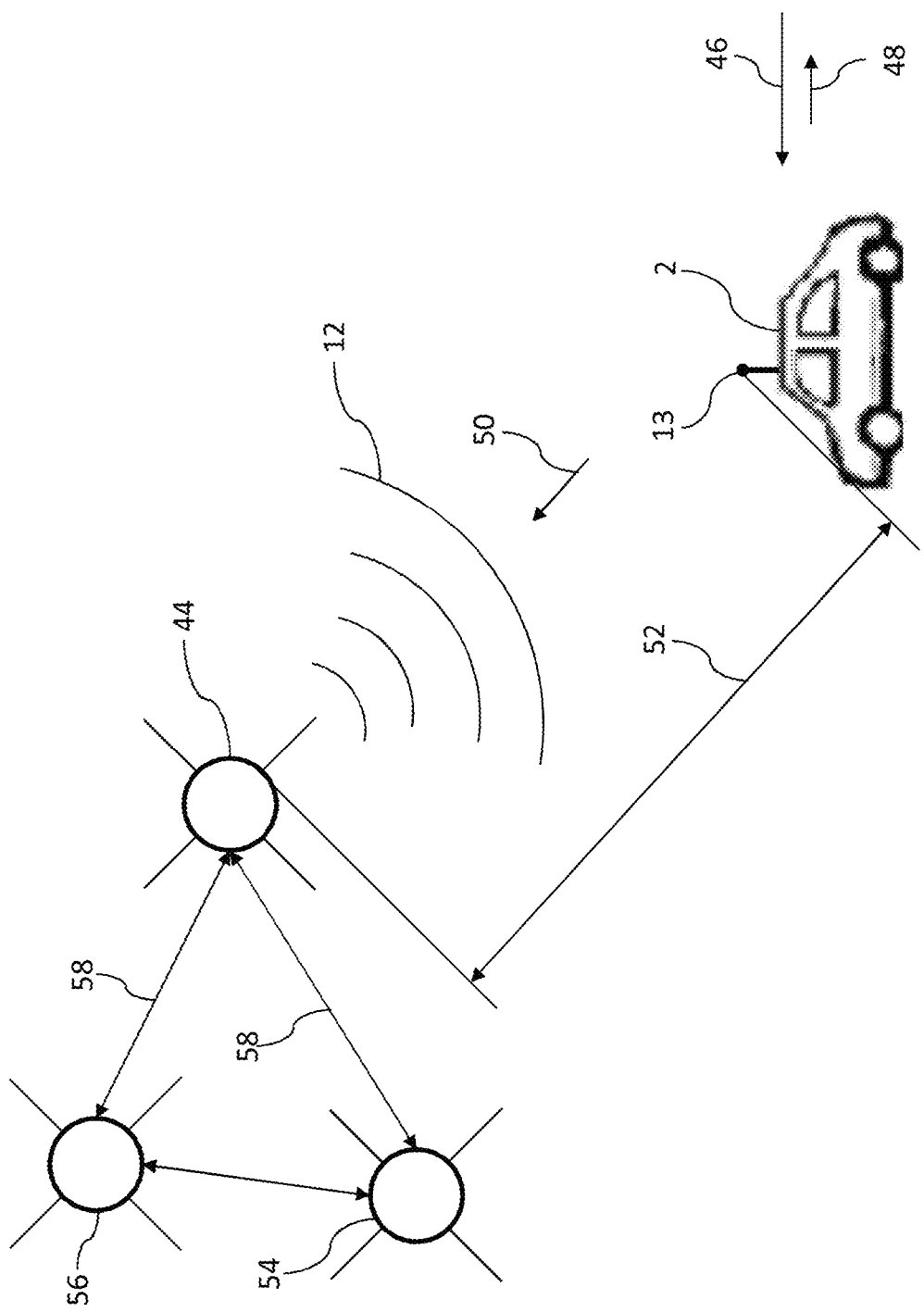
FIG. 3 shows a schematic illustration of a vehicle receiving a GNSS signal.

In the present development, the GNSS receiver 6 receives the GNSS signal 12 from a GNSS satellite 44 that is shown in FIG. 3. The GNSS signal 12 sent by this GNSS satellite 44 may be subject to a greater or lesser level of noise, for which reason the model 38 in the present embodiment is extended by a function that evaluates the GNSS signal 12 itself or the GNSS location data 8 derived on the basis of the GNSS signal 12 and then selects the GNSS satellite 44 as source for the GNSS signal 12 on the basis of the evaluation.

The methods below, illustrated with reference to FIG. 3, can be combined with one another as desired, even if they are described individually by themselves. It is thus not necessary to perform just one of the methods for selecting a satellite. The order is also not important initially.

Reference is made to FIG. 3, which shows a first schematic illustration of a vehicle 2 receiving the GNSS signal 12.

The vehicle 2 is moving over the road 10 at a speed 46 and an acceleration 48. In this case, it is intended to be assumed that the vehicle 2 is slowing down, as a result of which the speed 46 and the acceleration 48 are opposite. The speed 46 and the acceleration 48 can be determined from the GNSS signal 12.

This can be accomplished by differentiated carrier phase measurement for the GNSS signal 12, for example. This involves taking into account an alteration in the carrier phase of the GNSS signal 12 over time, said alteration being obtained on the basis of the Doppler effect caused by the moving vehicle 2. The result obtained for the differentiated phase measurement is a visual direction speed 50, which can be converted into the speed 46 and the acceleration 48 in a manner that is known to a person skilled in the art.

Alternatively or in addition, it is also possible to take into account the position of the vehicle on the basis of a code measurement, from which a distance 52 between vehicle 2 and the satellite 44 is detected by means of propagation time detection for the GNSS signal 12, from which distance the speed 46 and the acceleration 48 can be calculated likewise in a manner that is known to a person skilled in the art.

The first of the four methods is described below:

The core concept of the first method is that the speed 46 and the acceleration 48 must satisfy certain physical constraints that cannot be infringed. An ordinary automobile that is not designed for sporty driving will not travel faster than 300 km/h. In addition, it cannot be slowed down at more than 1.2 times acceleration due to gravity. If the GNSS signal 12 yields values that infringe this constraint, the satellite 44 can be eliminated or can be ignored as a source of information for the GNSS location data 8, as appropriate.

The second method is described below:

The second method is based on the consideration that a visual speed 50, that is to say the movement of the vehicle in the direction of the satellite, and a distance 52 to the satellite 44 can be recorded directly from the GNSS signal 12. The visual speed 50 and the distance 52 can be reconstructed on the basis of the more precisely defined location data 18 using alternative measurement principles, which means that the visual speed and distance to the satellite 44 that are derived from the GNSS signal 12 can be regarded as expected values for the visual speed 50 and the distance 52 that are transmitted with the GNSS signal 12.

The core concept of the second method is thus that deviations between the expected values and the corresponding information from the GNSS signal 12 must correspond to the total noise, that is to say that a deviation that can be calculated using the total noise corresponds to the aforementioned actual deviation.

This concept will be described below in a nonrestrictive manner with reference to a comparison of the visual speed 50 obtained from the GNSS signal 12. The second method can alternatively or additionally be performed in the same manner on the basis of the distance 52 to the satellite 44.

The measured noise $\sigma_{GNSS}$ for the visual speed 50 from the GNSS signal and an uncertainty about the more precisely defined location data 18 and also the uncertainty of all other measurement data used in the reconstructed visual speed 50 and hence the measured noise $\sigma_{rec}$ for the expected value add up to form a total measured noise $\sigma_{meas}=\sigma_{GNSS}+\sigma_{rec}$. In addition, a deviation $\mu$ can be determined between the visual speed 50 and the reconstructed visual speed, that is to say the expected value. For the selection of the satellite, a threshold is now stipulated for the extent to which a standard normal deviation obtained from the total measured noise:

$$\mu_{stan} = \sqrt{\sigma_{GNSS}+\sigma_{rec}}$$

deviates from the deviation $\mu$ in the expected value, that is to say the reconstructed visual speed relative to the visual speed 50 measured from the GNSS signal 12.

This ensures that the precision of the measured values 50, 52 transmitted with the GNSS signal 12 is matched to the precision of the expected value, that is to say the reconstructed visual speed and/or the reconstructed distance to the satellite from the more precisely defined location data 18 from the fusion sensor 4.

So that the specified method does not eliminate too many satellites 44, the threshold used for the deviation $\mu$ may be a multiple of the standard deviation $\mu_{stand}$, the multiple being able to be oriented to the desired spread for the selection.

The third method is described below.

The basic concept of the fourth method is to be able to determine the location of the satellite 44 and the further satellites 54, 56 relative to one another and from the point of view of the vehicle independently of the visual speed 50 and the distance 52, that is to say using information that is transmitted with the GNSS signal 12, for example.

When the location of the satellites 44, 54, 56 relative to one another is known, the visual speed 50 and the distance 52 to the individual satellites 44, 54, 56 cannot change arbitrarily. If all satellites are in front of the vehicle 2 in the direction of travel 46, for example, then all distances 52 to the individual satellites 44, 54, 56 must become correspondingly shorter.

In practice, this can be performed using a trigonometric comparison, for example. If the distances 58 of the satellites from one another are known, and the distances from the vehicle 2 to at least two of the satellites 54, 56, then the distance 52 is overdetermined, since it can be reconstructed from the prior information. Nevertheless, the reconstructed distance must correspond to the actual distance 52, and the quality of the GNSS signal 12 from the satellite 44 can then be assumed to be sufficient for the fusion sensor 4.

Ultimately, an overdetermined equation system that needs to be able to be resolved consistently can be set up from the total distances 58 between the satellites 44, 54, 56 and the measured distances 52 or the visual speeds 50 of the vehicle 2 relative to the satellites 44, 54, 56 mathematically using known trigonometric dependencies of the satellites 44, 54, 56 and the vehicle 2 relative to one another. An advantage of this equation system is that the inconsistency can be located and hence can be attributed to a particular satellite 44, 54, 56, as a result of which the relevant satellite 44, 54, 56 and hence the GNSS signal 12 therefrom can be eliminated.

Within the framework of the fourth method, it is a basic concept that the visual direction speed 50 and the distance 52 between the vehicle 2 and the satellite 44 are recorded using different measurement methods (carrier phase measurement and code measurement). They nevertheless need to correspond to one another. That is to say that if the distance 52 is derived on the basis of time, the visual direction speed 50 must be obtained. Otherwise, there is an error that can be taken as a basis for eliminating the satellite 44.

Preferably, the methods for selecting the satellite 44 are performed in the specified order, since firstly the precision checked by the specified methods and secondly the for performing the specified method increase from the first to the fourth method. It is therefore inconvenient from the point of view of computation to include satellites that are totally implausible on the basis of the physical constraints, which satellites can already be eliminated using the first method, in the equation system of the third method.

While the above description constitutes the preferred embodiment of the present invention, it will be appreciated that the invention is susceptible to modification, variation, and change without departing from the proper scope and fair meaning of the accompanying claims.

The invention claimed is:

1. A method for selecting a satellite that is designed to send a global navigation satellite system ("GNSS") signal to a vehicle, the method comprising:
    measuring, at a control apparatus of a vehicle, measurement location data for the vehicle with respect to the satellite on the basis of the GNSS signal received at a GNSS receiver of the vehicle, wherein the measurement location data includes a speed of the vehicle or an acceleration of the vehicle;
    determining, at the control apparatus, if a predetermined condition is satisfied by comparing the speed of the vehicle or the acceleration of the vehicle measured on the basis of the GNSS signal to a speed or an acceleration of the vehicle determined differently from the measurement location data for the vehicle determined on the basis of the GNSS signal;
    selecting, at the control apparatus, the satellite as a source for the GNSS signal for the vehicle when the speed of the vehicle or the acceleration of the vehicle measured on the basis of the GNSS signal satisfies the predetermined condition;
    determining, at the control apparatus, locations for at least three satellites from a point of view of the vehicle, wherein the at least three satellites have a known location relative to one another, said satellites comprising the satellite to be selected;
    determining, at the control apparatus, a relative distance for the vehicle relative to the satellite to be selected and a speed of the vehicle relative to the satellite to be selected in the visual direction of the satellite to be selected from the GNSS signal;
    selecting, at the control apparatus, the satellite as a source for the GNSS signal for the vehicle:
        when the speed of the vehicle relative to the satellite to be selected in the visual direction of the satellite to be selected from the GNSS signal or the acceleration of the vehicle measured on the basis of the GNSS signal satisfies the predetermined condition; and
        when the location of the three satellites relative to one another from a point of view of the vehicle and the measurement location data correlate; and
        when the determined relative distance and the determined relative speed correlate; and
    eliminating or ignoring, at the control apparatus, at least one of the at least three satellites as the source for the GNSS signal for the vehicle when the locations of the three satellites relative to one another from the point of view of the vehicle and a location of the at least one of the at least three satellites derived from the measurement location data do not correlate.

* * * * *